(12) United States Patent
Jojic et al.

(10) Patent No.: US 8,181,163 B2
(45) Date of Patent: May 15, 2012

(54) PROGRAM SYNTHESIS AND DEBUGGING USING MACHINE LEARNING TECHNIQUES

(75) Inventors: Vladimir Jojic, Toronto (CA); Nebojsa Jojic, Bellevue, WA (US); Sumit Gulwani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1408 days.

(21) Appl. No.: 11/745,295

(22) Filed: May 7, 2007

(65) Prior Publication Data
US 2008/0282108 A1 Nov. 13, 2008

(51) Int. Cl.
*G06F 9/45* (2006.01)
(52) U.S. Cl. ........................................................ 717/135
(58) Field of Classification Search ................... 717/135
See application file for complete search history.

(56) References Cited

U.S. PATENT DOCUMENTS

| 5,905,856 A | * | 5/1999 | Ottensooser | 714/38.1 |
| 6,275,976 B1 | * | 8/2001 | Scandura | 717/120 |
| 2007/0277130 A1 | * | 11/2007 | Lavelle | 716/4 |

* cited by examiner

*Primary Examiner* — John Chavis
(74) *Attorney, Agent, or Firm* — Workman Nydegger

(57) ABSTRACT

One embodiment is directed to synthesizing code fragments in a software routine using known inputs and corresponding expected outputs. A computer system provides a software routine with known inputs and corresponding expected outputs, infers software routine instructions based on the known inputs and corresponding expected outputs, and synthesizes a correctly functioning code fragment based on the inferred instructions. Another embodiment is directed to automatically resolving semantic errors in a software routine. A computer system provides the software routine with known inputs and corresponding expected outputs for portions of a program fragment where an error has been localized. The computer system learns a correctly functioning program fragment from pairs of input-output descriptions of the program fragment, determines the program statements that can transform given input states into given output states after execution of those program statements, and alters portions of the software routine with the learned program fragments.

20 Claims, 4 Drawing Sheets

Factor Graph 510

Factor Graph 520 a)

b)

PROGRAM SYNTHESIS AND DEBUGGING USING MACHINE LEARNING TECHNIQUES

BACKGROUND

Throughout the world, computers and embedded computing devices have been incorporated into nearly every facet of daily life. Computers process instructions by interpreting and executing software source code. Source code is typically written by software developers using one or more programming and/or scripting languages. Source code is often lengthy and complex, involving numerous functions and routines. Writing and debugging source code can often be a tedious job for software developers.

In order to make the drafting and debugging processes easier for software developers, source code is typically written within an integrated development environment (IDE). IDE's are software programs that have many features which are aimed to prevent developers from making mistakes while drafting source code (e.g. code coloring, syntax prompting, etc.). IDE's also provide a means for identifying errors that the developer may have overlooked and are still present in the code during the time of compilation. However, finding syntactical bugs in the source code is only a small part of developing functioning code. Determining how to draft the code that resolves the error is often more time consuming that finding the bug. Current IDE's have the ability to automatically detect many types of software bugs. However, IDE's lack the ability to automatically fix the bugs they find.

Furthermore, in some cases, a developer may know the inputs for a certain function as well as the expected outputs, and yet be unclear as to how to write the code that will result in the expected outputs with the given inputs. Still in other cases, a developer may be short on time and may only be able to write a skeleton structure or partial portion of what the finished code should look like. In such cases, the developer's only solution is to spend more time with the project, writing the code until it is complete. Current IDE's and other software drafting aides are not able to automatically draft entire or even partial code segments based on a set of corresponding input/output (I/O) pairs, despite advancements in the field of machine learning.

Machine learning is broadly concerned with developing algorithms and techniques that allow computers to learn. One way computers can "learn" is by analyzing massive amounts of data and attempting to discover rules or patterns that explain how the data was generated. In a method called "supervised learning", an algorithm can attempt to generate a function that maps inputs to desired outputs. Often, in order to generate such functions, a technique known as probabilistic inference is used. Other forms of machine learning are used to decipher patterns in large quantities of statistical data. However, machine learning has found limited, if any, application to synthesizing or automatically debugging program code.

BRIEF SUMMARY

Embodiments of the present invention are directed to systems, methods and computer program products for synthesizing code fragments in a software routine using known inputs and corresponding expected outputs for portions of the software routine. In one embodiment, a computer system synthesizes code fragments in a software routine using known inputs and corresponding expected outputs for portions of the software routine. The computer system provides a software routine with known inputs and corresponding expected outputs for the software routine. The computer system infers software routine instructions based on the known inputs and corresponding expected outputs. The computer system synthesizes a correctly functioning code fragment based on the inferred instructions for use in the software routine.

Other embodiments of the present invention are directed to systems, methods and computer program products for automatically resolving semantic errors in a software routine using known inputs and corresponding expected outputs for portions of the software routine that are known to have errors. In one embodiment, a computer system provides the software routine with known inputs and corresponding expected outputs for portions of a program fragment where an error has been localized. The computer system learns a correctly functioning program fragment from pairs of input-output descriptions of the program fragment. The computer system determines the program statements that can transform given input states into given output states after execution of those program statements. The computer system alters portions of the software routine with the learned program fragments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
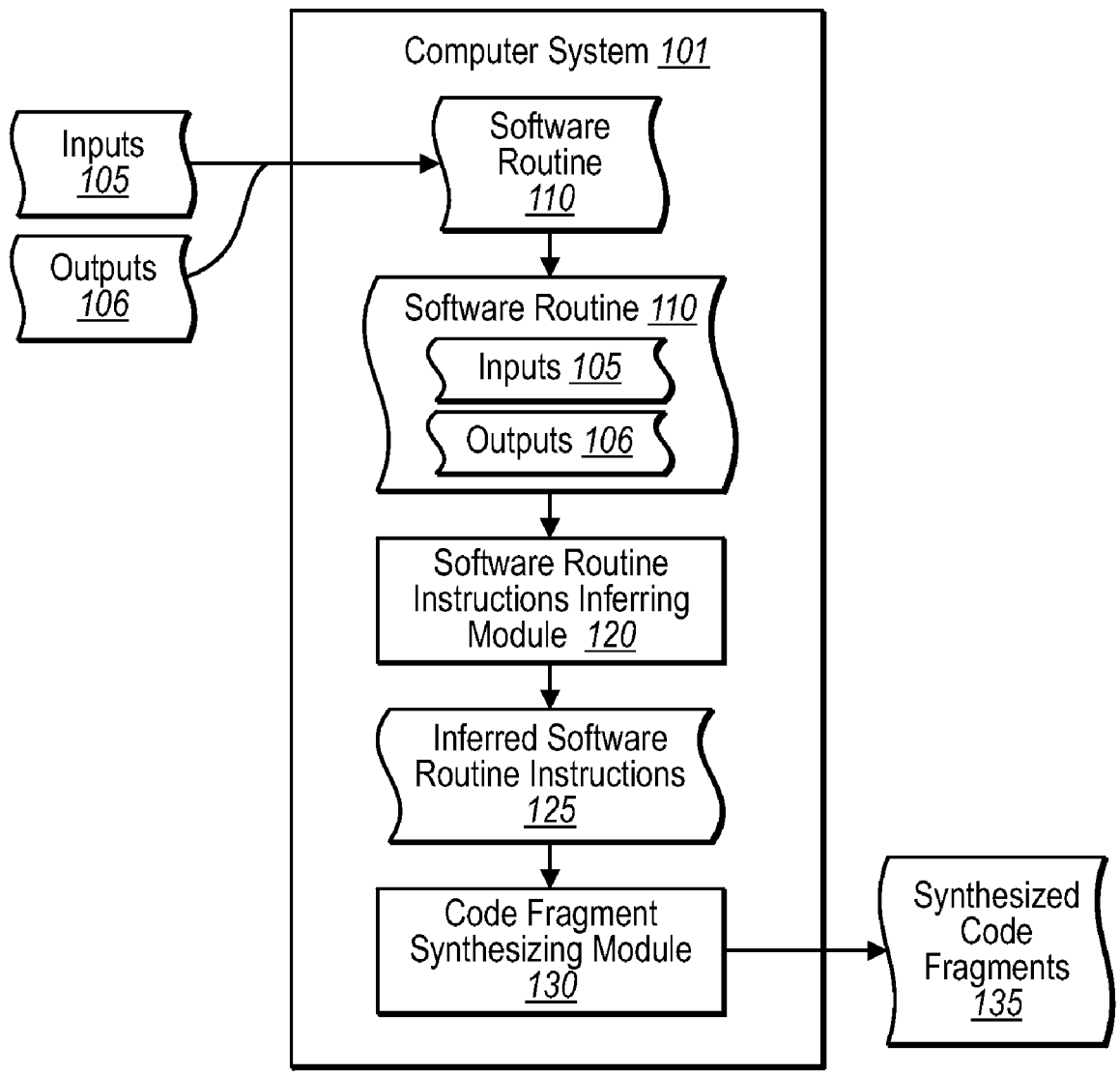
FIG. 1 illustrates a computer architecture in which embodiments of the present invention may operate including synthesizing code fragments in a software routine.

Embodiments of the present invention are directed to systems, methods and computer program products for synthesizing code fragments in a software routine using known inputs and corresponding expected outputs for portions of the software routine. In one embodiment, a computer system synthesizes code fragments in a software routine using known inputs and corresponding expected outputs for portions of the software routine. The computer system provides a software routine which is capable of producing the desired outputs for the given inputs. The computer system infers software routine instructions based on the known inputs and corresponding expected outputs. The computer system synthesizes a correctly functioning code fragment based on the inferred instructions for use in the software routine. The general expectation, in some embodiments, is that the synthesized code is capable of generalizing the expected behavior beyond the provided input-output pairs (i.e., it provides more that a simple look-up table).

Other embodiments of the present invention are directed to systems, methods and computer program products for automatically resolving semantic errors in a software routine using known inputs and corresponding expected outputs for portions of the software routine that are known to have errors. In one embodiment, a computer system provides the software routine with known inputs and corresponding expected outputs for portions of a program fragment where an error has been localized. The computer system learns a correctly functioning program fragment from pairs of input-output descriptions of the program fragment. The computer system determines the program statements that can transform given input states into given output states after execution of those program statements. The computer system alters portions of the software routine with the learned program fragments. The embodiments of the present invention may comprise a special purpose or general-purpose computer including various types of computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical (or recordable type) computer-readable media including RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable medium. Thus, any such connection is also properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

FIG. 1 illustrates a computer architecture 100 in which the principles of the present invention may be employed. Computer architecture 100 includes computer system 101. In some embodiments, computer system 101 may be configured to receive inputs 105 and outputs 106. Inputs 105 and outputs 106 may be any type of numerical and/or textual information. In some cases, numerical inputs will result in numerical outputs. In other cases, numerical inputs will result in textual outputs or a combination of textual and numerical outputs. The same is also true for textual inputs. Textual inputs may result in textual outputs, numerical outputs or a combination of textual and numerical outputs. Inputs and outputs may also include heap structures, or other known values. Within computer system 101, software routine 110 may be configured to receive inputs 105 and outputs 106. Software routine 10 may be any type of software program, function, routine or combination thereof, and/or individual lines of source code.

In some embodiments, computer system 101 may be configured to provide software routine instructions inferring module 120 with combined software routine 110 and inputs 105 and outputs 106. Software routine instructions inferring module 120 may be configured to infer software routine instructions based on known inputs 105 and corresponding expected outputs 106, as will be explained in greater detail below. Software routine instructions inferring module may be configured to send inferred software routine instructions 125 to code fragment synthesizing module 130. As will be explained in greater detail below, code fragment synthesizing module 130 may be configured to synthesize a correctly functioning code fragment based on the inferred instructions for use in the software routine. The resulting synthesized code fragments 135 may be sent from code fragment synthesizing module 130 to a computer user, a software application, another computer system, or to any other entity, device or application, local or remote.

Figure 3:
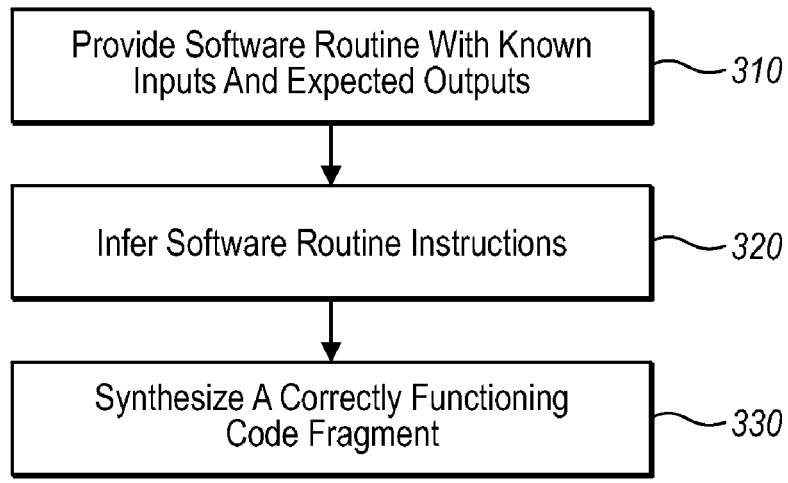
FIG. 3 illustrates a flowchart of an example method for synthesizing code fragments in a software routine.
Figure 5:
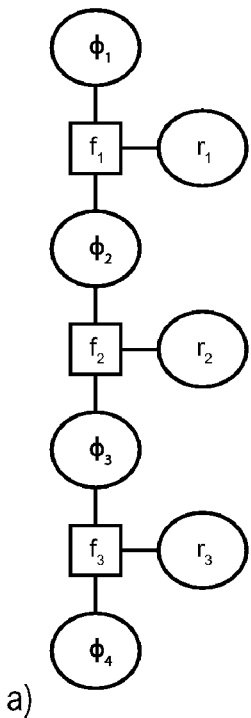
FIG. 5 illustrates example programs represented using factor graphs.
Figure 5:
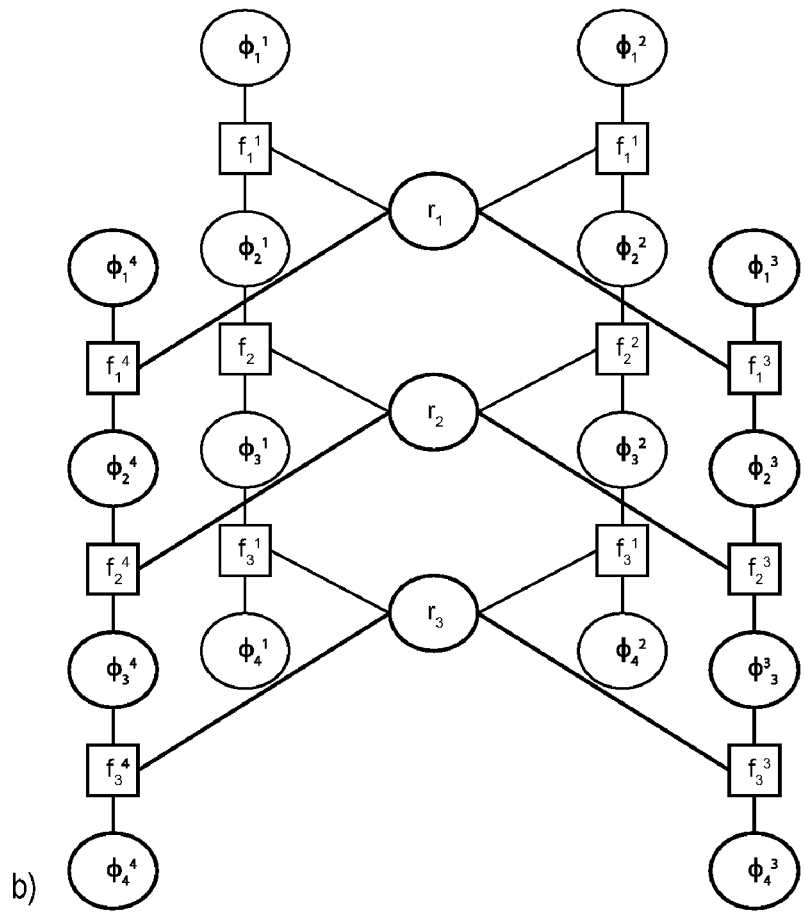

FIG. 3 illustrates a flowchart of a method 300 for synthesizing one or more code fragments in a software routine using one or more known inputs and corresponding expected outputs for portions of the software routine. The method 300 will now be described with frequent reference to the components and data of environment 100 of FIG. 1 and factor graphs 510 and 520 of FIG. 5.

In general, factor graphs describe the relationships of variables used in one or more program executions. These variables include program states at different program points, as well as the program instructions to be inferred. The function nodes in the graph quantify the level to which the local combinations of states and instructions are satisfied. In some cases, the total level of consistency of the program and its states equals the product of individual factors. Thus, the tasks described herein can be achieved by optimizing this product, for example by belief propagation, sampling techniques (e.g. Gibbs sampling, Markov Chain, Monte Carlo), variational inference methods, gradient descent and others.

Method 300 includes an act of providing a software routine with one or more known inputs and corresponding one or more expected outputs for the software routine (act 310). For example, known inputs 105 and corresponding one or more expected outputs 106 may be provided for software routine 10 by any of a computer user, a software program, computer system 101 or any other type of computer system. In some embodiments, the known inputs 105 and corresponding expected outputs 106 comprise source code modules and/or source code functions. For example, a source code module may be inputted into software routine 110 that results in an outputted source code module and/or source code function. Additionally or alternatively, a source code function may be inputted that results in an outputted source code module and/or or source code function.

Method 300 also includes an act of inferring software routine instructions based on the know inputs and corresponding expected outputs (act 320). For example, software routine instructions inferring module 120 may infer software routine instructions based on know inputs 105 and corresponding expected outputs 106. Software routine instructions may be inferred in a variety of ways using various techniques.

Some of these techniques include machine learning tools such as belief propagation and Gibbs sampling.

Thus, in some embodiments, software routine instructions may be inferred based on the know inputs and corresponding expected outputs using belief propagation. Simply stated, belief propagation is a process of computing a belief the random variables (which in the present setting are the unknown software routine instructions) having a specific value. One object of belief propagation is to test each belief regarding program states before and after each instruction is processed and evaluate whether, after processing the instruction, the program state is closer to or further from the expected or believed state. Belief propagation can be used to sample source code fragments (including source code modules and functions) that are similar to an existing fragment, but can make the fragment function more correctly than the previous fragment.

Other embodiments include inferring software routine instructions based on the known inputs and corresponding expected outputs using Gibbs sampling. Like belief propagation, Gibbs sampling is a machine learning technique that can be used to infer software routine instructions. In general, Gibbs sampling is an algorithm used to generate a sequence of samples from a probability distribution of one or more random variables (which in the present setting are the unknown software routine instructions). It is often used to approximate a joint distribution where the conditional distribution is known, but the joint distribution is unknown. Such techniques may be used to infer software routine instructions where the inputs and corresponding expected outputs are known.

Method 300 also includes an act of synthesizing a correctly functioning code fragment based on the inferred instructions for use in the software routine (act 330). For example, code fragment synthesizing module 130 may synthesize a correctly functioning code fragment 135 based on inferred software routine instructions 125 for use in software routine 110. In some embodiments, synthesizing can involve creating the code fragment from scratch. In such cases, code fragment synthesizing module 130 takes known inputs 105 and corresponding expected outputs 106 and creates the entire software code for the code fragment that allows inputs 105 to result in outputs 106. In other cases, code fragment synthesizing module 130 may modify existing source code, fill in holes, rearrange or make any type of changes to the source code such that known inputs 105 will result in outputs 106.

Code fragment synthesizing module 130 may be used in many ways to achieve the desired results. For example, code fragment synthesizing module 130 may be used to synthesize a correctly functioning code fragment that is configured to fit one or more polynomials over a finite field. In one example, all polynomials with degrees less or equal to 5 on finite fields of order 5, 7, 11 may be fitted by constructing a factor graph consisting of a state sequence for each input/output pair. Inference in factor graphs follows a simple set of rules of message propagation, as will be explained in reference to factor graphs 510 and 520 in FIG. 5.

In some embodiments, each edge in the factor graph is associated with a pair of messages. One type of messages are those that are sent from variable node to function node. The second type of messages are those that are sent from function nodes to variable nodes. Factor graph 510 represents example program "a" where a program is executed based on a single input. Variable nodes in factor graph 510 are represented as circles while function nodes are represented as squares. The variable nodes can represent program states and/or program instructions. These variable nodes are labeled with $\Phi_k$ and $r_i$ respectively. Each pair of successive program state variables, $\Phi_k$ and $\Phi_{k+1}$, in addition to an instruction variable $r_k$, are connected to a function node $f_k$.

In some embodiments, the function $f_k$ may be configured to enforce agreement between states and instructions (i.e. between known inputs 105 and corresponding expected outputs 106). The first type of message may have an informal interpretation of informing a function node about constraints imposed on the variable by other function nodes. The second type can be interpreted as informing a variable about how each of its possible values agrees with other variables connected to the function node. Hence, computation of the second type of messages involves summing all, or a portion of, the possible values for any given variables and weight each combination of states with messages passed on from the variables to function f.

Continuing this example related to factor graph 510, if messages from all of the neighbors of a particular variable are given, a marginal probability can be computed for that variable. An algorithm for computing this probability may be initialized by setting the messages to near uniform distributions. The message updates may then be iterated according to a schedule until convergence. Such an algorithm will typically produce exact marginal probability distributions in a tree structured factor graph. These probability distributions can be used, for example, to fit polynomials over a finite field. In the above example, where inputs 105 and outputs 106 are fixed, the algorithms may yield marginal probability distributions from which the most likely instruction for $r_i$ can be derived or inferred.

Factor graph 520 represents an example program "b" which shows the result of a program applied to four different inputs. In this example, for an input of index t, there exists a sequence of $\Phi_t^k$s which represents execution of the program on the particular input represented by state $\Phi_t^t$. As is apparent in FIG. 5, the factor graph 520 is considerably more complex than that of 510. This is a result of an increased number of inputs. It should be noted that any number of inputs and corresponding outputs are possible. It may be possible to have multiple inputs with the same corresponding expected output. Similarly, it may be possible to have a single input with multiple expected outputs, dependant on the software routine (e.g. a pseudo-random sequence is used in the software routine).

Synthesized code fragments 135 created by code fragment synthesizing module 130 may also be used to discover the code for list-manipulating operations like list reversal and/or list insertion. Other embodiments can include list manipulation, creation, or permutation. In some embodiments, the entire software code for the software routine may be synthesized. In such cases, a computer user may only know certain inputs and corresponding outputs, from which the entire software code may be synthesized such that the given inputs result in the corresponding expected outputs. Additionally or alternatively, source code modules and/or source code functions may be used when synthesizing correctly functioning code fragments. For example, inputs 105 may include source code modules and/or source code functions that, when used with software routine 110, result in corresponding expected outputs 106.

Figure 2:
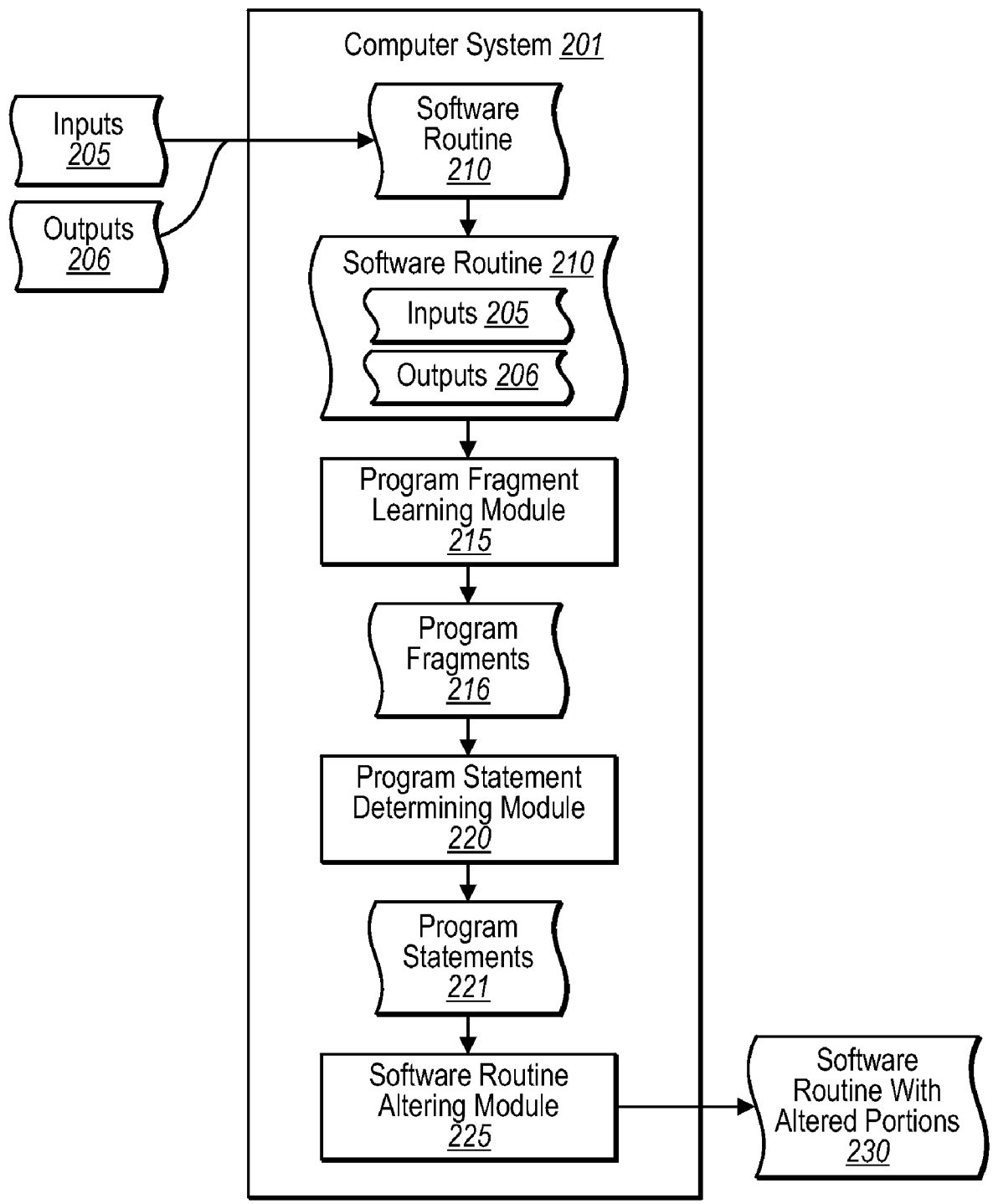
FIG. 2 illustrates a computer architecture in which embodiments of the present invention may operate including automatically resolving semantic errors in a software routine.

FIG. 2 illustrates a computer architecture 200 in which the principles of the present invention may be employed. Computer architecture 200 includes computer system 201. In some embodiments, computer system 201 (and, more specifically, software routine 210) may be configured to receive inputs 205 and outputs 206. As mentioned above regarding inputs 105 and outputs 106, inputs 205 and outputs 206 may be any type or combination of numerical or textual inputs or outputs. In some cases, known inputs 205 and corresponding expected outputs 206 are provided for portions of a program fragment where a bug has been localized. Software routine 210 may be any type of software program, function, routine or combination thereof, or individual lines of source code. In some embodiments, computer system 201 is configured to send software routine 210 combined with inputs 205 and outputs 206 to program fragment learning module 215.

Computer system 201 includes a program fragment learning module 215. In some embodiments, program fragment learning module 215 may be configured to receive a software routine with inputs and outputs 210 and learn a correctly functioning program fragment from pairs of input-output descriptions of the program fragment, as will be explained further below. Program fragment learning module 215 may also be configured to pass program fragment 216 to program statement determining module 220. Computer system 201 includes program statement determining module 220. In some embodiments, program statement determining module 220 may be configured to receive program fragment 216 and determine the program statements that can transform one or more given input states into one or more given output states after those program statements, as will be explained in greater detail below. Program statement determining module 220 may also be configured to pass program statement 221 to software routine altering module 225.

Computer system 201 includes a software routine altering module 225. In some embodiments, software routine altering module 225 may be configured to receive program statement 221 and alter portions of software routine 210 with the program fragments that have been previously learned, as will be explained further below. Computer architecture 200 also includes a software routine with altered portions 230. Computer system 201 and/or software routine altering module 225 may be configured to transmit software routine with altered portions 230 to an external destination or, alternatively, may simply pass the invariant to another program running on computer system 101.

Figure 4:
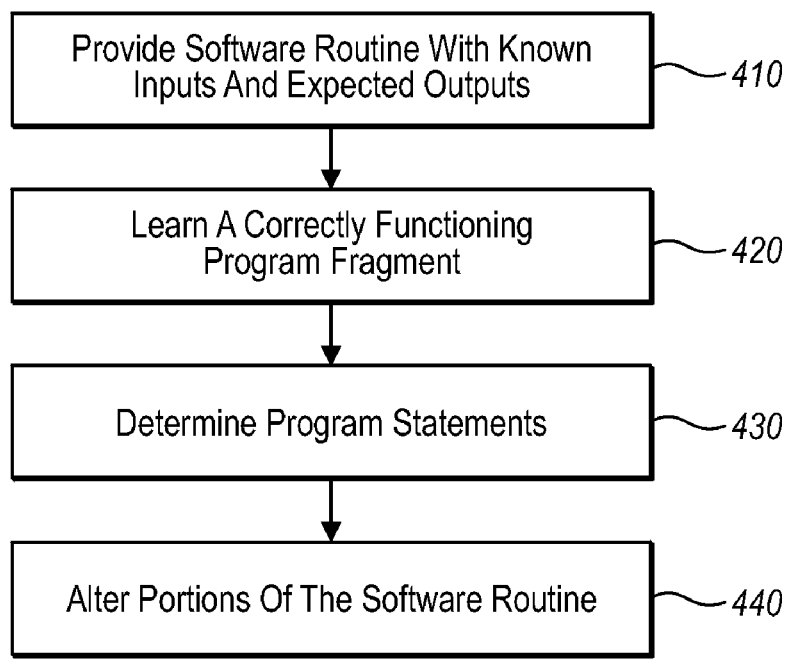
FIG. 4 illustrates a flowchart of an example method for automatically resolving semantic errors in a software routine.

FIG. 4 illustrates a flowchart of a method 400 for automatically resolving semantic errors in a software routine using one or more known inputs and the corresponding expected outputs for portions of the software routine that are known to have errors. The method 400 will now be described with frequent reference to the components and data of computer architecture 200.

Method 400 includes an act of providing the software routine with one or more known inputs and corresponding one or more expected outputs for portions of a program fragment where an error has been localized (act 410). For example, known inputs 205 and corresponding one or more expected outputs 206 may be provided to software routine 210 for portions of a program fragment where an error has been localized. In some embodiments, the known inputs and expected outputs are provided by a computer user. In other embodiments, inputs 205 and outputs 206 may be provided by a software program. In some cases, a computer user may provide one or more input/output sets for portions of a program fragment where a bug has been localized. A program fragment may be, for example, be a software routine (e.g. software routine 210), a portion of a program function, or even a single line of source code. In some embodiments, known inputs 205 and expected outputs 206 may include source code modules and/or source code functions, as will be explained in greater detail below.

Method 400 includes an act of learning a correctly functioning program fragment from pairs of input-output descriptions of the program fragment (act 420). For example, program fragment learning module 215 may learn a correctly functioning program fragment from pairs of input-output descriptions of the program fragment (e.g. software routine with inputs and outputs 210). In some embodiments, program fragment learning module 215 may learn a correctly functioning program fragment from pairs of input-output descriptions of the program fragment using belief propagation. Belief propagation is a general machine learning technique for probabilistic inference. Similar sampling techniques, such as Gibbs sampling, are also used to "learn" a program fragment. For example, program fragment learning module 215 may learn a correctly functioning program fragment from pairs of input-output descriptions of the program fragment using Gibbs sampling. In some cases (as in the above embodiment), a program fragment already exists. In such cases, a new program fragment is learned because the existing fragment is not functioning properly.

Machine learning techniques such as belief propagation may also be used to sample source code fragments that are similar to the existing fragment, but will make the fragment function more correctly than the previous fragment. One way of achieving this is by running belief propagation in the factor graphs in which messages from each instruction variable are initially set to ascribe a high probability to the corresponding instruction in the given (buggy) piece of code. Similar initializations of the program instructions can be used in conjunction with other learning and optimization algorithms to speed up the program inference, under the assumption that the identified piece of code is only partially incorrect.

In other cases, it may be possible for the software routine to include no source code and for the computer system to learn a correctly functioning program fragment based only on the provided input/output pairs. Program fragment learning module 215 may also be capable of selecting source code modules or functions from some collection and combining them (e.g., instead of discovering the fragment from scratch) to synthesize a correctly functioning program fragment based on the provided input/output pairs.

Method 400 includes an act of determining the program statements that can transform one or more given input states into one or more given output states after those program statements using belief propagation (act 430). For example, program statement determining module 220 may determine program statements 221 that can transform one or more given input states into one or more given output states after those program statements. As explained above, to achieve a correctly functioning program fragment, the program statements must be chosen that allow the given input state to result in the given output state.

If such is not the case, then the bug in the program fragment has not been fixed and a different selection of program statements must be tried. In some embodiments, belief propagation may be used to determine the program statements that can transform one or more given input states into one or more given output states after execution of those program statements. Additionally or alternatively, Gibbs sampling may be used to determine the program statements that can transform one or more given input states into one or more given output states after execution of those program statements.

Method 400 includes an act of altering portions of the software routine with the learned program fragments (act 440). For example, software routine altering module 225 may alter portions of software routine 210 with the program fragments that have been learned in acts 420 and 430, resulting in software routine with altered portions 230. In some embodiments, where no source code is provided, automatically resolving semantic errors comprises synthesizing the source code (i.e. program fragment) for the software routine based on the known inputs and corresponding expected outputs. In some cases, some combination of existing source code modules and/or source code functions is used when altering portions of the software routine. Also, in some cases, belief propagation may be used to learn programs that manipulate lists. For example, belief propagation may be used to learn programs such as list reversal and list insertion programs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system, a method for synthesizing one or more code fragments in a software routine using one or more known inputs and corresponding expected outputs for portions of the software routine, the method comprising:
   an act of providing a software routine with one or more known inputs and corresponding one or more expected outputs for the software routine;
   an act of inferring software routine instructions based on the known inputs and corresponding expected outputs; and
   an act of synthesizing a correctly functioning code fragment based on the inferred instructions for use in the software routine.

2. The method of claim 1, wherein the act of inferring software routine instructions based on the known inputs and corresponding expected outputs comprises using belief propagation to infer the software routine instructions.

3. The method of claim 1, wherein the act of inferring software routine instructions based on the known inputs and corresponding expected outputs comprises using Gibbs sampling to infer the software routine instructions.

4. The method of claim 1, further comprising using a factor graph to describe relationships between variables used in one or more program executions, the program executions being optimized by one or more of belief propagation, sampling techniques, variational inference methods and gradient descent.

5. The method of claim 1, wherein the synthesized correctly functioning code fragment is configured to perform list manipulations.

6. The method of claim 1, wherein the synthesized correctly functioning code fragment is configured to perform list insertions.

7. The method of claim 1, wherein the entire software code for the software routine is synthesized.

8. The method of claim 1, wherein the known inputs and corresponding expected outputs comprise source code modules and/or source code functions.

9. The method of claim 8, wherein source code modules and/or source code functions are used when synthesizing correctly functioning code fragments.

10. The method of claim 1, wherein the known inputs and expected outputs are provided by a computer user.

11. At a computer system, a method for automatically resolving semantic errors in a software routine using one or more known inputs and corresponding expected outputs for portions of the software routine that are known to have errors, the method comprising:
   an act of providing the software routine with one or more known inputs and corresponding one or more expected outputs for portions of a program fragment where an error has been localized;
   an act of learning a correctly functioning program fragment from pairs of input-output descriptions of the program fragment;
   an act of determining the program statements that can transform one or more given input states into one or more given output states after execution of those program statements; and
   an act of altering portions of the software routine with the learned program fragments.

12. The method of claim 11, wherein in the act of learning a correctly functioning program fragment from pairs of input-output descriptions of the program fragment comprises using belief propagation to learn the correctly functioning program fragment.

13. The method of claim 11, wherein the act of determining the program statements that can transform one or more given input states into one or more given output states after execution of those program statements comprises using belief propagation to determine the program statements.

14. The method of claim 11, wherein in the act of learning a correctly functioning program fragment from pairs of input-output descriptions of the program fragment comprises using Gibbs sampling to learn the correctly functioning program fragment.

15. The method of claim 11, wherein automatically resolving semantic errors comprises synthesizing the source code for the software routine based on the known inputs and corresponding expected outputs.

16. The method of claim 11, wherein the known inputs and expected outputs comprise source code modules and/or source code functions.

17. The method of claim 16, wherein source code modules and/or source code functions are used when altering portions of the software routine.

18. The method of claim 11, wherein the known inputs and expected outputs are provided by a computer user.

19. A computer program product comprising one or more tangible computer-readable media having thereon computer-executable instructions that, when executed by one or more processors of a computing system, cause the computing system to perform a method for synthesizing one or more code fragments in a software routine using one or more known inputs and corresponding expected outputs for portions of the software routine, the method comprising: an act of providing the software routine with one or more known inputs and corresponding one or more expected outputs for the software routine; an act of inferring software routine instructions based on the known inputs and corresponding expected outputs; and an act of synthesizing a correctly functioning code fragment based on the inferred instructions for use in the software routine.

20. The computer program product of claim 19, wherein the act of inferring software routine instructions based on the known inputs and corresponding expected outputs comprises using belief propagation to infer the software routine instructions.

* * * * *